(12) United States Patent
Kazmi et al.

(10) Patent No.: US 8,804,561 B2
(45) Date of Patent: Aug. 12, 2014

(54) PHYSICAL CELL IDENTIFIER (PCI) ADAPTATION TO MITIGATE INTERFERENCE IN HETEROGENEOUS CELLULAR NETWORK

(75) Inventors: Muhammad Kazmi, Bromma (SE); Gary Boudreau, Kanata (CA); Iana Siomina, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 170 days.

(21) Appl. No.: 13/501,172

(22) PCT Filed: Dec. 8, 2011

(86) PCT No.: PCT/SE2011/051482
§ 371 (c)(1),
(2), (4) Date: Apr. 10, 2012

(87) PCT Pub. No.: WO2012/150889
PCT Pub. Date: Nov. 8, 2012

(65) Prior Publication Data
US 2012/0281573 A1 Nov. 8, 2012

Related U.S. Application Data

(60) Provisional application No. 61/481,931, filed on May 3, 2011.

(51) Int. Cl.
*H04W 88/00* (2009.01)
(52) U.S. Cl.
USPC .......................... 370/252; 370/242; 455/510

(58) Field of Classification Search
CPC ..... H04L 12/26; H04L 43/50; H04L 43/0852; H04L 43/08; H04W 24/02; H04W 4/12; H04W 80/04; H04J 3/14; H04B 7/2628
USPC .......... 370/252, 242, 328, 338; 455/510, 517, 455/456.1, 466, 436
See application file for complete search history.

(56) References Cited

U.S. PATENT DOCUMENTS

| | | | |
|---|---|---|---|
| 2011/0070897 A1* | 3/2011 | Tang et al. | 455/456.1 |
| 2011/0077038 A1 | 3/2011 | Montojo et al. | |
| 2012/0100851 A1* | 4/2012 | Zheng et al. | 455/436 |
| 2012/0213109 A1* | 8/2012 | Xu et al. | 370/252 |

(Continued)

OTHER PUBLICATIONS

International Search Report and Written Opinion in corresponding international application No. PCT/SE2011/051482 dated Feb. 13, 2012.

(Continued)

*Primary Examiner* — Charles C Jiang
*Assistant Examiner* — Rose Clark
(74) *Attorney, Agent, or Firm* — Nixon & Vanderhye P.C.

(57) ABSTRACT

A first radio network node ($HBS_1$) adapts its physical cell identifier ($PCI_1$) based on a comparison of its $PCI_1$ to a second PCI ($PCI_2$) used by a neighboring interfering second radio network node (e.g., another $HBS_2$ or a macro node). The first radio network node $HBS_1$ determines the second PCI based on one or more radio measurements performed on a cell 402 and/or on a UE 404 served by the second node. The adaptation of the cell identifier $PCI_1$ is used for one or more radio network management tasks, e.g., resource management such as interference mitigation in a heterogeneous network, radio network planning, etc.

26 Claims, 9 Drawing Sheets

(56) References Cited

U.S. PATENT DOCUMENTS

2012/0236741 A1\* 9/2012 Xu et al. .................... 370/252
2012/0275315 A1\* 11/2012 Schlangen et al. ........... 370/242
2013/0303217 A1\* 11/2013 Tao .............................. 455/501

OTHER PUBLICATIONS

Motorola et al., "Draft CR capturing HeNB inbound mobility agreements", 3GPP Draft; R2-095342, Aug. 24, 2009.

\* cited by examiner

PHYSICAL CELL IDENTIFIER (PCI) ADAPTATION TO MITIGATE INTERFERENCE IN HETEROGENEOUS CELLULAR NETWORK

This application is the U.S. national phase of International Application No. PCT/SE2011/051482 filed 8 Dec. 2011 which designated the U.S. and claims the benefit of U.S. Provisional Application No. 61/481,931 filed 3 May 2011, the entire contents of each of which are hereby incorporated by reference.

BACKGROUND

The technology relates to cellular radio communications, and in particular, to mitigating interference between base stations and their served devices.

The constantly increasing demand for higher data rates in cellular networks raises the challenging question for operators of how to evolve their existing cellular networks so as to meet this requirement for higher data rates. In this regard, a number of approaches are possible: 1) increase the density of the typical existing macro (larger, higher power) base stations, 2) increase the cooperation between macro base stations, or 3) deploy smaller lower power base stations as an overlay to the macro cellular network in areas where high data rates are needed within the macro network topology.

In 3GPP, the last option (3) is commonly referred to as a "Heterogeneous Network" or "Heterogeneous Deployment." The lower power base station nodes are referred to by a variety of names including "micro", "pico", "femto" or "home" base stations (HBS) depending on the transmit power and targeted coverage of the low power nodes. Specifically, the deployment of femto base stations, e.g. Home NB (HNB) in 3GPP UTRA or Home eNBs (HeNB) in LTE, can lead to much greater local coverage and throughput, e.g., for in-building users.

Often, HeNB's are deployed using a Closed Subscriber Group (CSG) in order to restrict authorized users of the HeNB to an identified and approved set of users or UEs (user terminals). When CSG HeNB's are deployed as an overlay to an existing macro cellular network deployment, macro network UEs (MUEs) that are not part of the CSG can adversely affect the CSG HeNB. FIG. 1 illustrates two possible interfering examples. In a first example, interference can occur if MUE (non-CSG) 104 is near the edge of the macro cell coverage 111 of serving cell base station macro eNB 101 and receiving a relatively weak downlink (DL) signal, while simultaneously being close to a HeNB (serving cell 103) and receiving a relatively strong interfering DL signal from the CSG HeNB 102. This will lead to reduced DL throughput for the MUEs and possible loss of coverage depending on the strength of the CSG HeNB interferer. Though a similar situation can occur between HeNB's in the same macro overlay network, the near-far problem between a HUE 107 served by one CSG HeNB 102 versus a HUE served by a second CSG HeNB is likely to be less severe. In a second example, on the UL, a similar situation can occur in which a non-CSG MUE 104 UL signal and/or non-CSG HUE 105 UL signal can cause interference to CSG HeNB 102 UL if they are in relative close proximity to CSG HeNB (serving cell 102).

In a CSG HeNB deployment, one solution to this interference problem for the non-CSG MUE or HUE is to handover the MUE or other HeNB HUE to the CSG HeNB and thus let the non CSG MUE or the other HeNB HUE be served by the CSG HeNB. However, in a CSG HeNB deployment, such a handover for non-CSG MUEs is in general not possible because the CSG HeNB cannot directly communicate with the macro eNB since, in general, HeNBs are not linked to the macro radio access network via S1 or X2 interfaces.

Another potential issue is that another HeNB in the vicinity of the CSG HeNB may have the same physical cell identifier (PCI) as the CSG HeNB which may cause not only data channel interference to the HUEs of the CSG HeNB, but incorrect control channel signals that may result in a complete outage of the HUE due to incorrect access grant, resource block assignments, incorrect power control, incorrect ACK/NAK signaling, or a variety of other control channel errors.

A number of potential approaches may be used to mitigate the interference to non-CSG MUEs within the coverage area of CSG HeNB's. One possible approach employs some form of autonomous power control of the CSG HeNB transmit power based on the received signal power from the MUE or on the strongest co-channel interferer as seen by the HeNB. These approaches can reduce the interference and outage as seen by the MUE. However, the HeNB has no direct knowledge of the radio bearers (RBs) that the MUE is scheduled on or the actual level of interference that the MUE is receiving since the received signal strength received from the MUE in the UL at the HeNB is different from the strength of a DL signal received from the HeNB at the MUE, e.g., because of different transmit power levels of base stations and UEs which may also be dynamically controlled. As such, it is difficult for the HeNB to accurately adjust its power to sufficiently reduce the interference to the non-CSG MUE without overly reducing the received signal power as seen by its own HeNB UEs, and thus, overly penalizing the throughput of the CSG HeNB UEs (HUEs).

A second possible approach is to have the HeNB avoid scheduling its UEs on the same RBs as the MUE that is in close proximity to the HeNB. This approach can effectively mitigate the interference but reduces the capacity of the HeNB. Moreover, the HeNB generally does not have a priori knowledge of the RBs that the MUE will be scheduled on.

Another problem in the CSG environment or in an environment with a low power radio node is that strict physical cell identifier (PCI) planning is difficult because a CSG HBS can be moved from one location to another. Moreover, there can be a very large number of CSG HBSs in a small coverage area, e.g., in a large apartment complex. Given that usually there are only a limited number of PCIs (e.g. 504 in LTE), the reuse of PCIs in closely-placed CSG HBSs may lead to severe interference in the network deteriorating the network performance.

SUMMARY

In one non-limiting example embodiment, a first radio network node (e.g., an HBS), associated with a first cell identifier, adapts its cell identifier based on a comparison between the first cell identifier and a second cell identifier used by a second radio network node (e.g., another HBS or a macro node). The first radio network node determines the second cell identifier based on one or more radio measurements performed on the second node and/or on a UE served by the second node. The adaptation of the first cell identifier is used for one or more radio network management tasks, e.g., resource management such as interference mitigation in a heterogeneous network, radio network planning, etc.

In accordance with a non-limiting aspect of the technology described herein, at least one radio signal measurement is made of an uplink (UL) signal transmitted by user equipment (UE) served by a second radio network node or a downlink (DL) signal transmitted by the second radio network node.

In accordance with another non-limiting aspect of the technology described herein, a first cell identifier is adapted by replacing a first cell identifier with a second cell identifier when the first cell identifier and the second cell identifier do not match. Active UEs, served by the first radio network node are thereafter notified of the replacement second cell identifier. After completing one or more intervals, the adapted PCI is reverted back to the first cell identifier if the uplink (UL) and/or the downlink (DL) signal radio measurements fall below a respective interference level or threshold. The active UEs, served by the first radio network node, are notified of the reversion back to the first cell identifier.

In accordance with another non-limiting aspect of the technology described herein, when the first and second cell identifiers do not match, the first cell identifier is replaced when: one or more uplink (UL) and/or downlink (DL) radio measurements used for determining a second cell identifier are above a respective interference threshold or a total number of replacement attempts of first cell identifier does not exceed a certain number N; N≥1 over a certain time period T1.

In accordance with another non-limiting aspect of the technology described herein, when replacing the first cell identifier a coordinated multi-point transmission/reception (CoMP) session is set-up between the first radio network node and the second radio network node and thereafter downlink (DL) signals of the first and second radio network nodes are aligned.

In accordance with another non-limiting aspect of the technology described herein, replacement of first cell identifiers is in accordance with one or more of the following triggers: 1) periodic triggering, 2) receiving a request from a third radio network node, 3) receiving a request from a subscriber or an owner of the first radio network node, 4) making one or more of uplink (UL) and/or downlink (DL) radio measurements, 5) detecting a change in physical location or geographical proximity of the first radio network node, or 6) triggering based on one or more pre-determined rules.

In accordance with another non-limiting aspect of the technology described herein, adapting the first cell identifier includes retaining the first cell identifier when the first cell identifier and the second cell identifier are the same and subsequently setting up a coordinated multi-point transmission/reception (CoMP) session.

In accordance with another non-limiting aspect of the technology described herein, adapting the first cell identifier comprises replacing the first cell identifier with a third cell identifier when the first cell identifier and the second cell identifier are the same.

In accordance with another non-limiting aspect of the technology described herein, based on the radio measurements and adapted first cell identifier, handover of at least one user equipment (UE) served by the second radio network node is accepted.

In accordance with another non-limiting aspect of the technology described herein, the first radio network node is a home base station associated with a closed subscriber group.

In accordance with another non-limiting aspect of the technology described herein, the determined second cell identifier or information associated with the determined second cell identifier is signaled to a third radio network node.

In accordance with another non-limiting aspect of the technology described herein, one or more radio management tasks comprise any of: radio resource management, cell identifier planning, network planning, interference management, configuration of low interference subframes or time-division multiplexing (TDM) patterns, configuration of downlink/uplink (DL/UL) cell bandwidth, setting of time division duplexing uplink/downlink (TDD UL/DL), and subframe configurations.

In another example embodiment, a first radio network node (e.g., an HBS), associated with a first cell identifier, adapts its cell identifier based on a comparison between the first cell identifier and a second cell identifier used by a second radio network node (e.g., another HBS or a macro node). The first radio network node determines the second cell identifier based on a measured downlink (DL) and/or uplink (UL) radio signal associated with one or more neighboring interfering systems and selects at least a first neighboring interfering system in accordance with the measuring step, the selected first neighboring interfering system having an associated second radio network node. The adapting of the first cell identifier is performed with two possible scenarios: 1) when the first cell identifier and second cell identifier are different, by replacing the first cell identifier with the second cell identifier and performing one or more radio management tasks during one or more intervals using the second cell identifier, or 2) when the first cell identifier and second cell identifier are the same, by either setting up a coordinated multi-point transmission/reception (CoMP) session between the first radio network node and the second radio network node or adapting the first cell identifier to a third cell identifier.

In accordance with another non-limiting aspect of the technology described herein, adapting the first cell identifier to a third cell identifier comprises at least one of the following: 1) determining strongest neighboring interfering system based on measured downlink (DL) and/or uplink (UL) radio signals, 2) selecting a third cell identifier for the first radio network node where the selected third cell identifier is different than second cell identifiers of at least M, M≥1, strongest second radio network nodes, and 3) selecting a third cell identifier for the first radio network node out of list of K, K≥1, cell identifiers, wherein the K cell identifiers are: pre-determined, configured or provided by a third network node, randomly selected by the first radio network node, or selected by the first radio network node based on properties of the third cell identifier.

In another example embodiment, a first radio network node using a first cell identifier, includes processing circuitry configured to: perform radio signal measurements, determine a second cell identifier associated with the second radio network node based on the performed measurements, compare the first cell identifier of the first radio network node with the determined second cell identifier of the second radio network node, adapt the first cell identifier with the second cell identifier based on the comparing step, and perform, during one or more intervals, one or more radio management tasks using the adapted cell identifier.

In another example embodiment, a first radio network node, using a first cell identifier includes processing circuitry configured to: measure downlink (DL) and/or uplink (UL) radio signals associated with one or more neighboring interfering systems, select at least a first neighboring interfering system in accordance with the measuring step, the selected first interfering system having an associated second radio network node, obtain a second cell identifier associated with the second radio network node, compare the first cell identifier of the first radio network node with the second cell identifier. When the first cell identifier and second cell identifier are different the first node replaces the first cell identifier with the second cell identifier and performs one or more radio management tasks during one or more intervals using the second cell identifier. When the first cell identifier and second cell identifier are the same, the first node sets up a coordinated multi-point transmission/reception (CoMP) session between the first radio network node and the second radio network node or adapts the first cell identifier to a third cell identifier.

DETAILED DESCRIPTION

Figure 1:
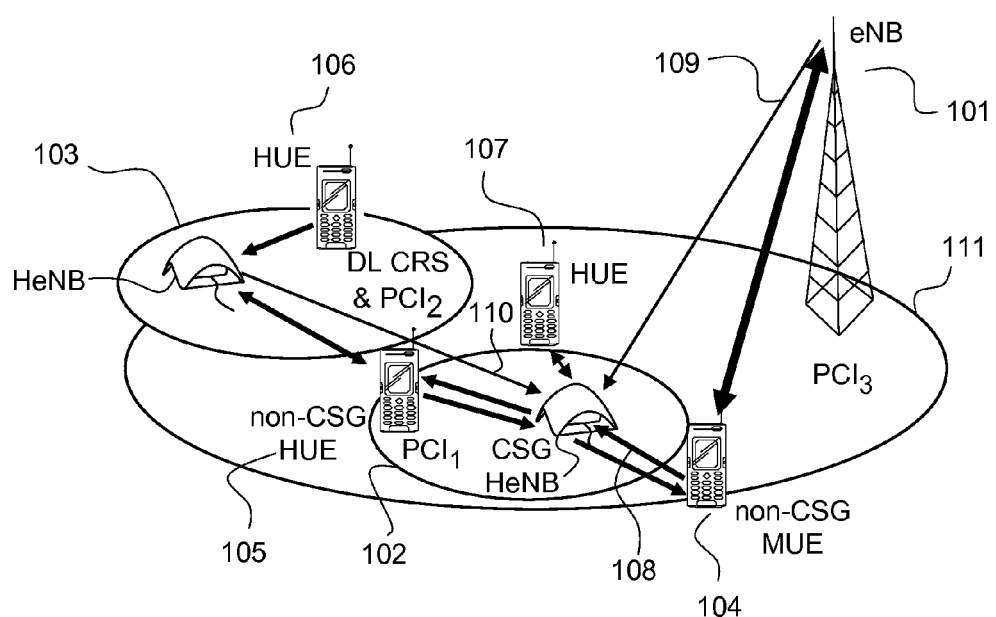
FIG. 1 illustrates various Macro, CSG HENB, and HeNB nodes and associated served UEs.

The following description sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Non-limiting example embodiments of the technology described in this application may be used to adapt a cell identifier of any network node. The cell identifier adaptation helps to reduce interference in the uplink and/or downlink in a network operating in an interference-limited situation. Examples of a network operating under interference-limited scenario are systems with low frequency reuse such as reuse-1 (e.g. CDMA, WCDMA, HSPA, SC-FDMA, OFDMA, LTE etc). The interference situation is even more challenging in a heterogeneous network with low frequency reuse. Even more difficult is the interference situation in a heterogeneous network that includes a macro layer and CSG layer.

The technology may also be used for network planning to avoid reuse of cell identifiers in network nodes which are geographically close to each other or to avoid interference of colliding signals in the time-frequency domain, where the signal transmissions (e.g., a cell reference signal (CRS)) in the time-frequency domain are determined by the cell identifiers.

The following terminologies are used for consistency and simplicity.

Network node: the technology may apply to any network and in particular to a heterogeneous network comprising network nodes using any technology including HSPA, LTE, CDMA2000, GSM, etc. or a mixture of technologies such as with a multi-standard radio (MSR) node (e.g., LTE/HSPA, GSM/HS/LTE, CDMA2000/LTE, etc). Furthermore, the technology may apply to different types of nodes e.g. base station, eNode B, Node B, relay, BTS (base transceiver station), donor node serving a relay node (e.g. donor base station, donor Node B, donor eNB), supporting one or more radio access technologies. Therefore, a generic term such as macro network node or simply macro node (MN) and home BS (HBS) may be used. Furthermore, instead of using CSG, a more generic term "HBS with restricted access" may be used. Hence CSG node or CSG LPN (low power node) can be regarded as a special case of HBS with restricted access. The term HBS and HBS with restricted access may interchangeably be used but both refer to the same type of node. The macro node such as macro BS may also be called a wide area BS which serves users in a macro cell. The wide area and home BS power classes are defined for HSPA and LTE in 25.104[1] and 36.104[2], respectively. The term macro node or macro BS is not limited to a wide area BS power class rather may refer to any BS class other than the HBS. For simplicity, only the term macro BS or macro node is used.

First radio network node: The first radio network node is one performing radio measurement on signals transmitted by a second radio network node or by the UE. Any of the network nodes mentioned above may be a first radio network node.

Second radio network node: Any of the network nodes mentioned above can be a second radio network node.

Third network node: The first radio network node communicates with a third network node. The first radio network node can signal information based on the radio measurements to the third network node. The third node can partly or fully perform network management and planning tasks. Non-limiting examples of third nodes are SON node, centralized node, network planning and management node, MDT management node, RNC, BSC, another eNB, donor node, donor BS, O&M node, OSS node etc.

Radio Measurements: Non-limiting examples of radio measurements are DL signal strength (e.g. RSRP in LTE, CPICH RSCP in HSPA, GSM BCCH RSSI, CDMA2000 1x RTT Pilot Strength, CDMA2000 HRPD Pilot Strength etc), DL signal quality (e.g. RSRQ in LTE, CPICH Ec/No in HSPA, GSM RSSI etc), UL signal strength (e.g. Received interference power in LTE (RIP), received code power in HSPA etc), UL signal quality (e.g. SINR, SNR etc), cell identification or acquisition of cell identifier (e.g. PCI acquisition, CGI acquisition, ECGI acquisition, GSM/GERAN BCCH carrier information, GSM/GERAN BSIC etc), reading of system information or broadcasted cell information (e.g. reading of broadcast channel such as MIB, SIBs etc) etc.

HUE and MUE: The terms home UE (HUE) and macro UE (MUE) denote wireless devices, terminals, or even small nodes (e.g. fixed relays, mobile relays, terminal acting as relay, etc.) which are camped on, connected to, or served by the HBS and MN, respectively.

Figure 2:
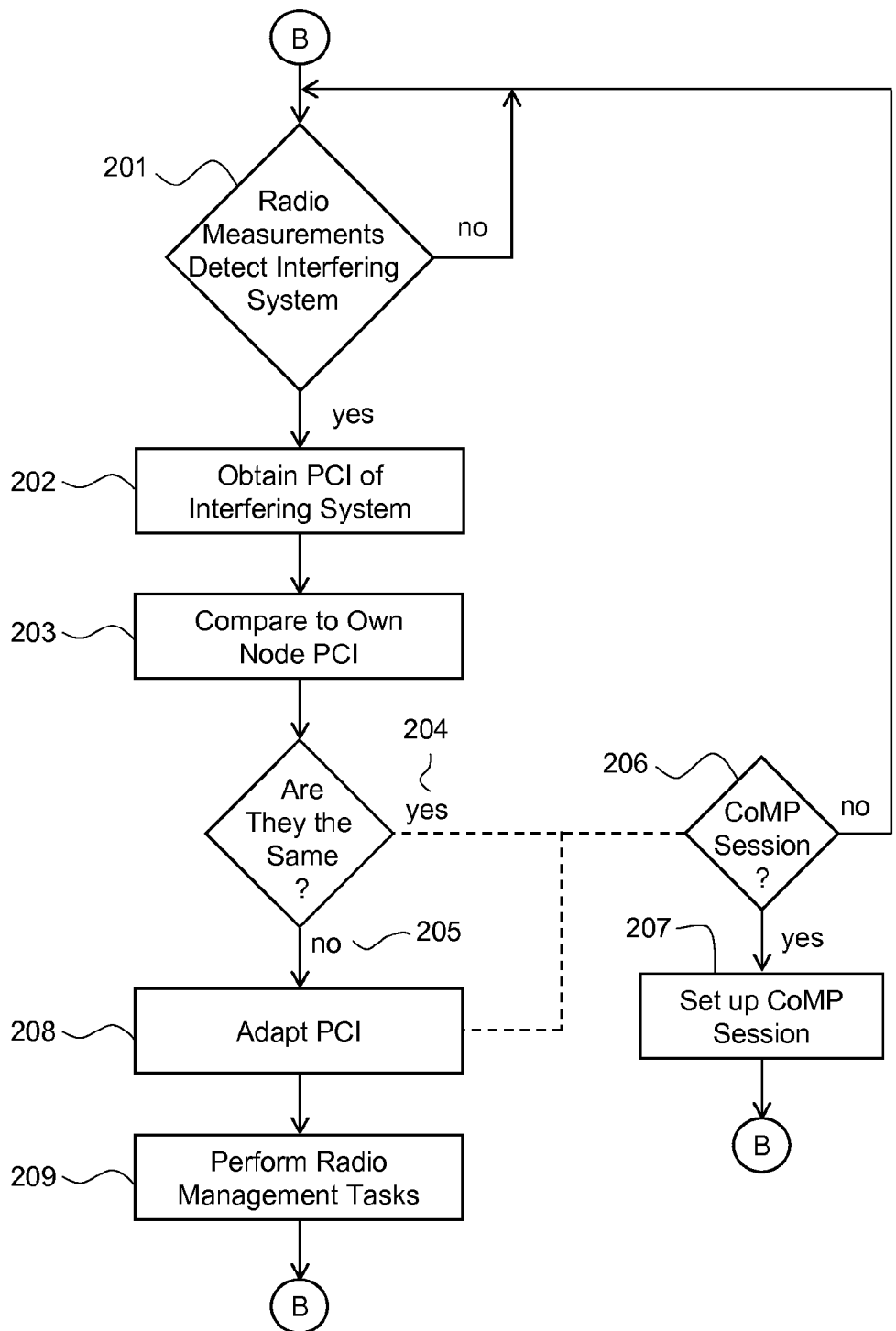
FIG. 2 is a flowchart diagram illustrating PCI adaptation between neighboring systems (i.e. nodes).

FIG. 2 is a flowchart diagram illustrating PCI adaptation between neighboring systems (i.e. nodes). In step 201, a first radio network node (e.g. an HBS, such as CSG HeNB (102)) performs a series of radio measurements on uplink signals (UL) 108 transmitted by a UE (e.g. non-CSG MUE 104) served by a second radio network node (e.g. macro node 101) and/or downlink (DL) signals 109 transmitted by macro node 101 to detect any potentially interfering systems. In step 202, a physical cell identifier (e.g. $PCI_3$) of interfering system 101, is obtained. In step 203, interfering system PCI (e.g. $PCI_3$) is compared to a PCI (e.g. $PCI_1$) of first radio network node 102. The PCIs are compared to determine if they are the same 204 or different 205. The first radio network node can adapt its PCI 208 by any of: when the compared PCIs are different, replace its PCI (e.g. $PCI_1$) with the PCI (e.g. $PCI_3$) of interfering system 208; retain the first PCI when the first PCI and the second PCI are the same, or replace the first PCI with a third PCI when the first cell identifier and the second cell identifier are the same. In step 209, the first radio network node with adapted PCI (e.g. $PCI_3$), performs various radio network management tasks, e.g., resource management such as interference mitigation in a heterogeneous network, radio network planning, etc. If the PCIs are the same, an optional coordinated multipoint session (CoMP) 206 can be initiated 207 (discussed in more detail hereafter).

In step 208, the adapting step may be performed when one or more UL and/or DL radio measurements obtained in step 201 are above a respective threshold (i.e., interference from other nodes is high) or the total number of adaptation attempts of first radio network PCIs does not exceed a certain number (N; N≥1) over a certain time period (T1).

Steps 201-208 (i.e. initiating the procedure of determination of second cell identifier and adaptation of the first cell identifier) may be triggered based on one or more of the following: 1) periodically where the periodicity (T2) is predetermined and/or configured by a third radio network node, 2) upon receiving an explicit request from a third radio network node, 3) upon receiving an explicit request from a subscriber or owner of the first radio network node (e.g. HBS owner), 4) based on one or more UL and/DL radio measurements e.g. when their measured value falls below their respect threshold or the interference is too high, 5) upon change in physical location or geographical proximity of the first radio network node, the first radio network node may acquire periodically or upon turning on its location and compare to its previous location, if the movement distance exceeds a certain threshold, the triggering procedure may be initiated, and 6) based on one or more pre-determined rules—non-limiting examples include: upon initial setup or initialization of the first radio network node, or upon configuration of radio parameters such as upgrading and/or downgrading of the first radio network node, e.g., change of bandwidth, UL-DL TDD subframe configuration etc.

The technology described herein may be embodied in many possible scenarios; examples of such non-limiting scenarios will be described hereafter.

Figure 3:
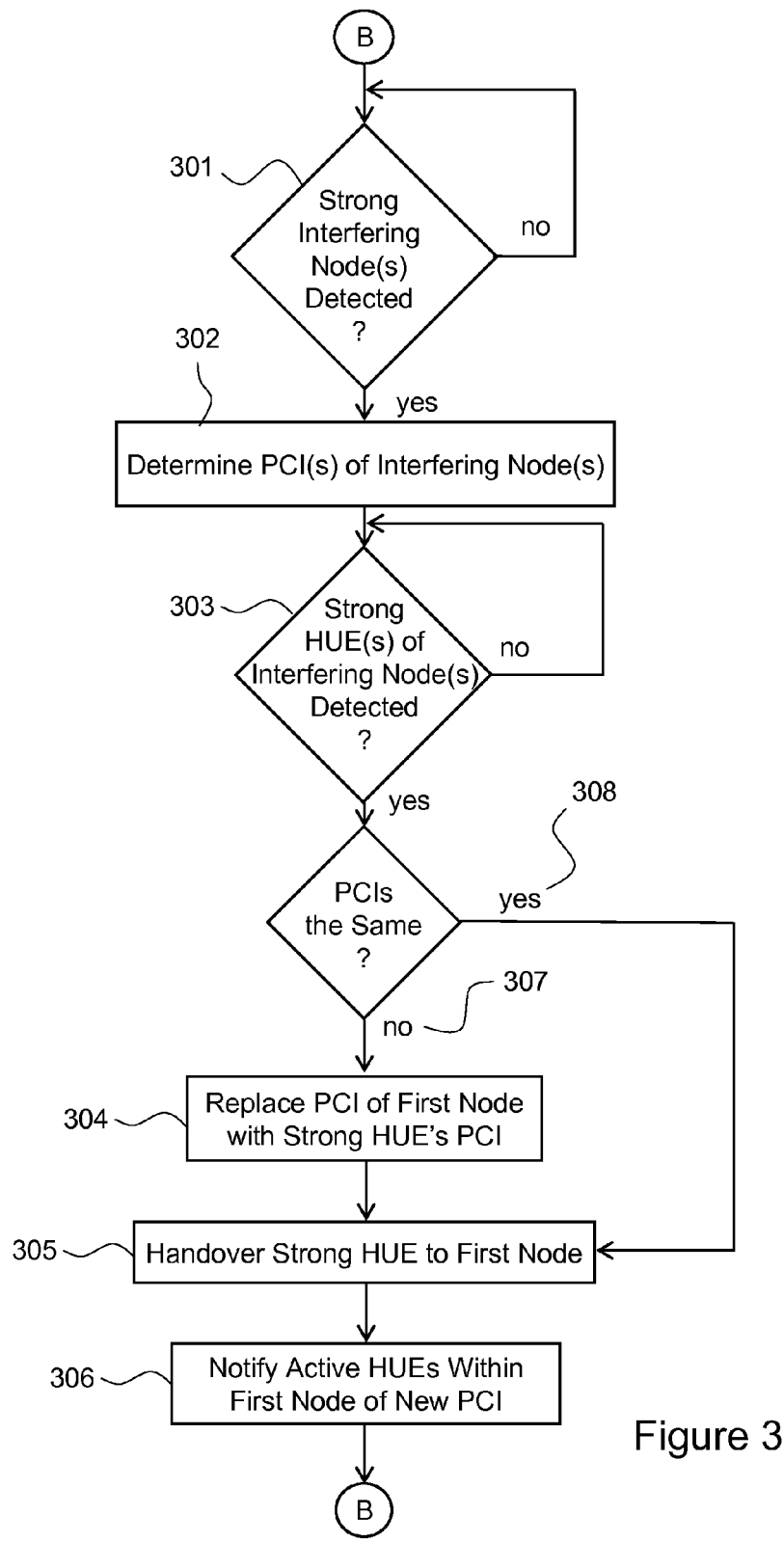
FIG. 3 is a flowchart diagram illustrating PCI replacement between neighboring systems (i.e. nodes).
Figure 4A:
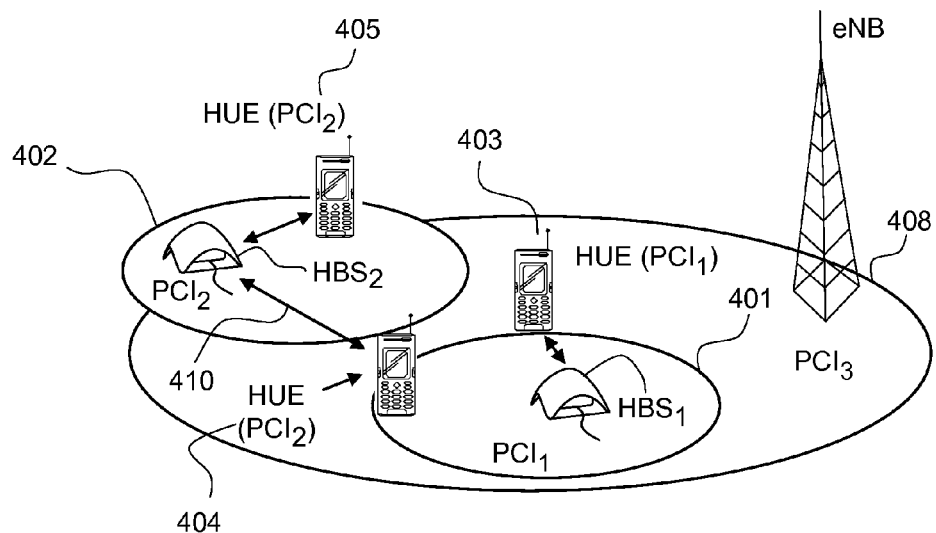
FIGS. 4a and 4b, collectively, illustrate a network diagram of the steps of FIG. 3 for neighboring HBSs.
Figure 4B:
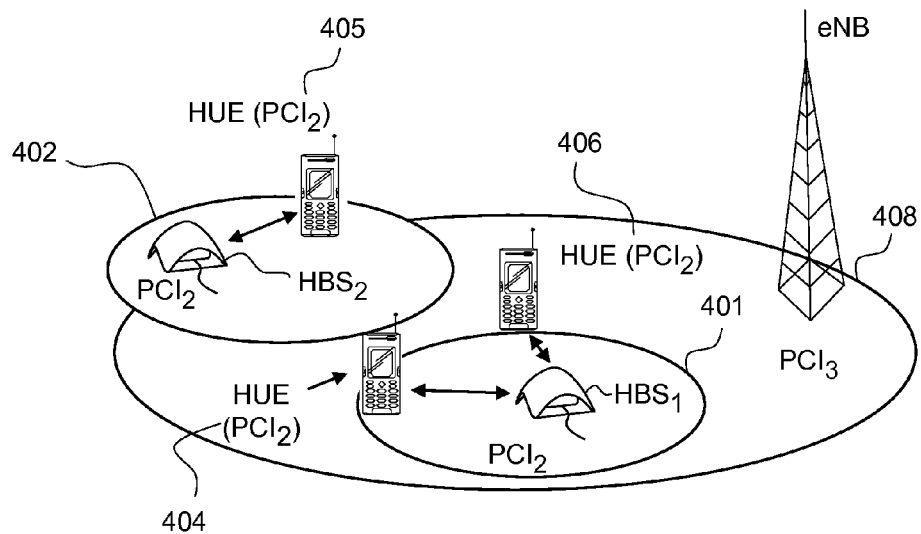

FIG. 3 is a flowchart diagram illustrating PCI replacement between neighboring nodes (e.g. HBSs). FIGS. 4a and 4b, collectively, illustrate a network snapshot before and after implementation of the steps of FIG. 3.

In step 301, a first radio network node (e.g. $HBS_1$ serving cell 401) detects a strong neighboring interfering second radio network node, for example, $HBS_2$ serving cell 402 with HUEs 404 and 405. In step 302, $HBS_1$ determines the PCI (e.g. $PCI_2$) of $HBS_2$ and, in step 303, determines if $HBS_2$ has a strong interfering HUE, in this example HUE 404 (typically at/or about the edge of $HBS_1$ cell 401). If a strong interfering HUE is detected, and the PCIs are different $PCI_1$ $PCI_2$ 307, $PCI_1$ is adapted by replacing it with $PCI_2$. After adaptation of $PCI_2$, or if they were the same 308, step 305 provides for handing over strong interfering HUE 404 to $HBS_1$ with $PCI_2$. In step 306, all active HUEs (e.g. 403) of $HBS_1$ are notified and operate with new $PCI_2$ 406.

Figure 5:
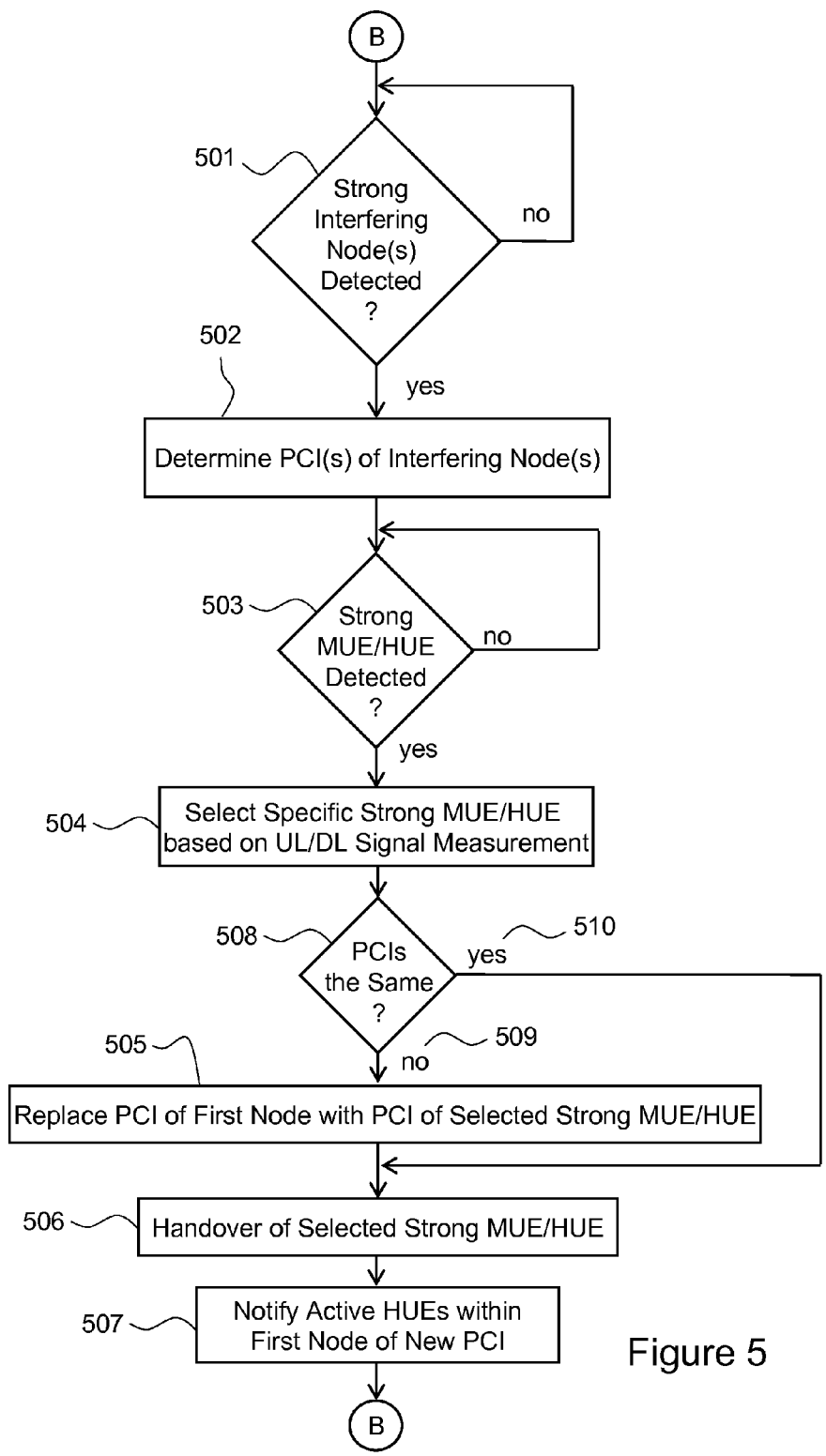
FIG. 5 is a flowchart diagram illustrating interference reduction between a HBS and multiple interfering systems.
Figure 6A:
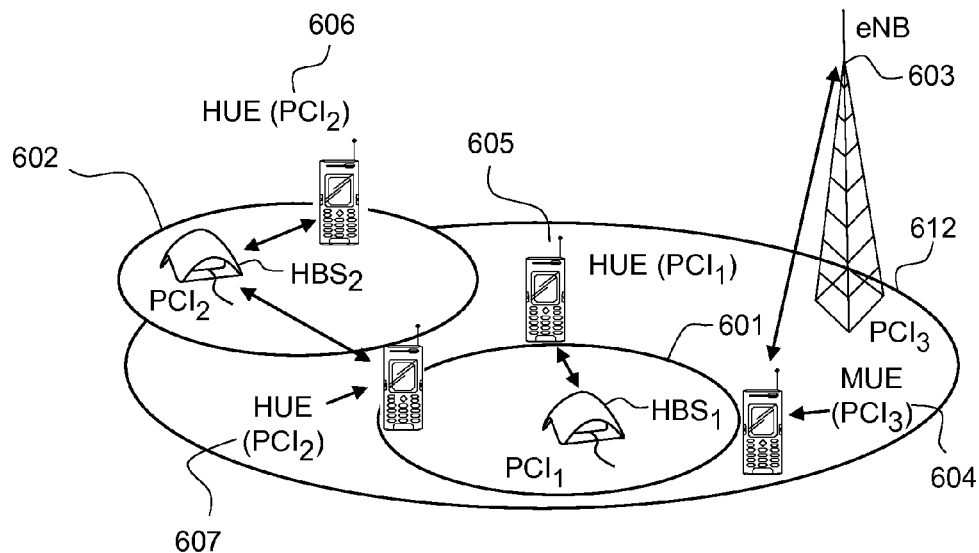
FIGS. 6a and 6b, collectively, illustrate a network diagram of the steps of FIG. 5.
Figure 6B:
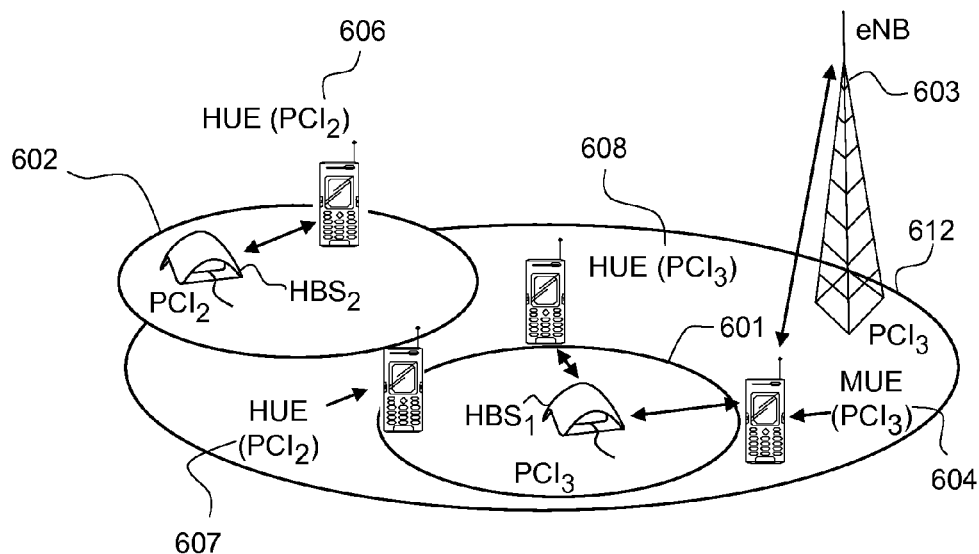

FIG. 5 is a flowchart illustrating a non-limiting example for interference reduction between $HBS_1$ (serving cell 601 with HUE 605) and multiple interfering systems eNB 603 (serving cell 612) and $HBS_2$ (serving cell 603). FIGS. 6a and 6b collectively, illustrate an example network snapshot before and after implementation of the steps of FIG. 5.

In step 501, a first radio network node $HBS_1$ detects strong interfering radio network nodes—macro node (eNB) 603 and $HBS_2$. In addition, macro node 603 serves MUE 604 and $HBS_2$ serves HUEs 606 and 607. Step 502 determines the PCIs ($PCI_2$ and $PCI_S$ respectively) of the interfering radio network nodes (macro node (eNB) 603 and $HBS_2$). Step 503 determines if the interfering radio network nodes have a strong UE (i.e. HUE/MUE), in this case HUE 607 for $HBS_2$ and MUE 604 for macro node 603. If a strong HUE/MUE is detected, step 504 selects a strongest MUE/HUE based on the UL/DL radio measurements (in this example MUE 604) and in step 508 compares the associated PCIs. If the PCIs are different $PCI_1 \neq PCI_3$ 509, in step 505 it adapts $PCI_1$ by replacing it with $PCI_3$. After adaptation of $PCI_1$, or if they were the same 510, the strong MUE 604 is handed over to $HBS_1$ using $PCI_3$. In step 506, all active HUEs 605 of $HBS_1$ are notified and operate with $PCI_3$ 608.

For the DL and UL interference scenarios described above and illustrated in FIGS. 2-6b, once an interfering system (e.g. strong interfering HUE(s)/MUE(s)) are outside the coverage region of $HBS_1$ (e.g. CSG HeNB), $HBS_1$ may switch its adapted PCI back to its original value $PCI_1$.

Figure 7:
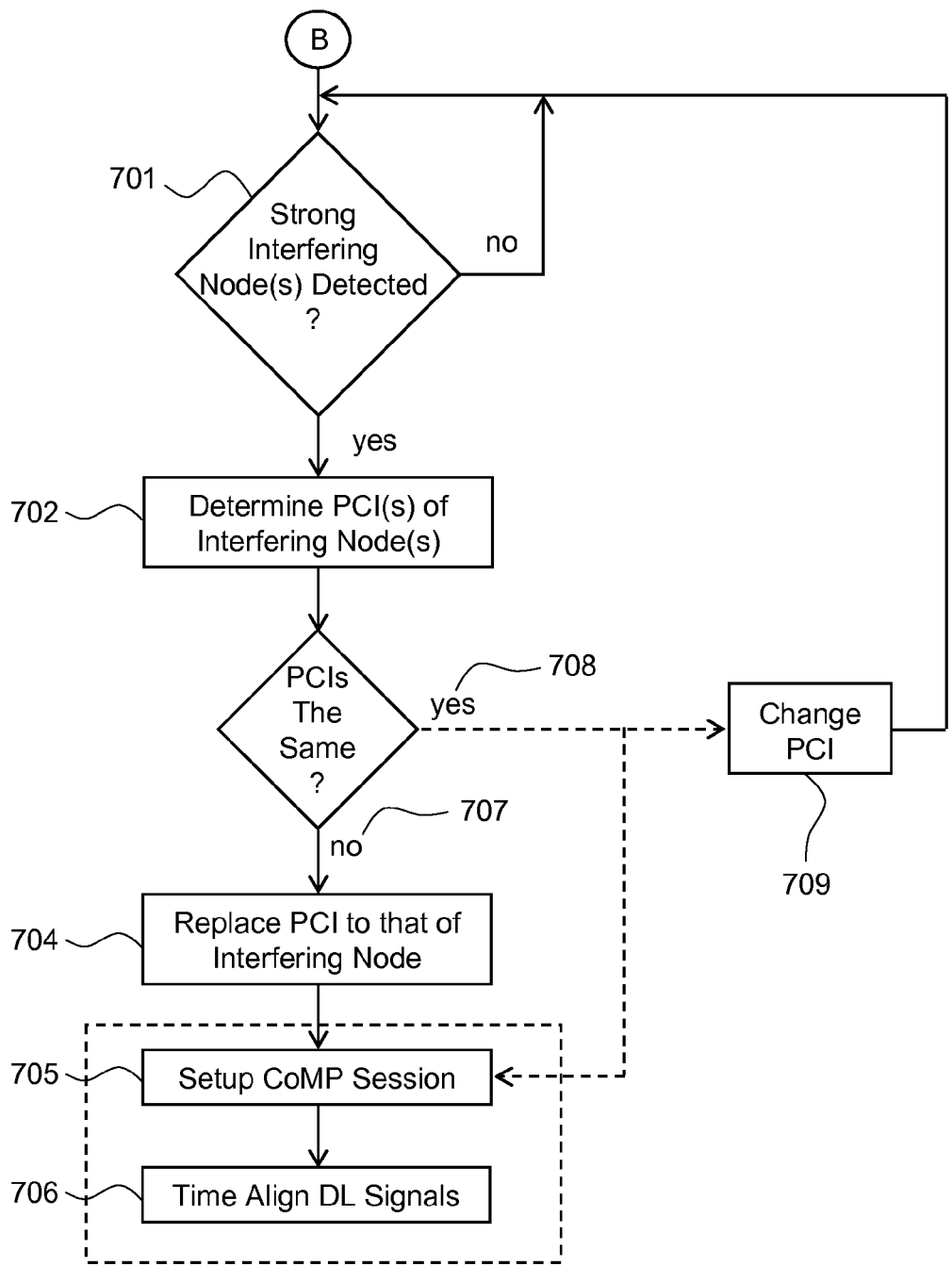
FIG. 7 is a flowchart diagram illustrating an example HBS CoMP Session.
Figure 8A:
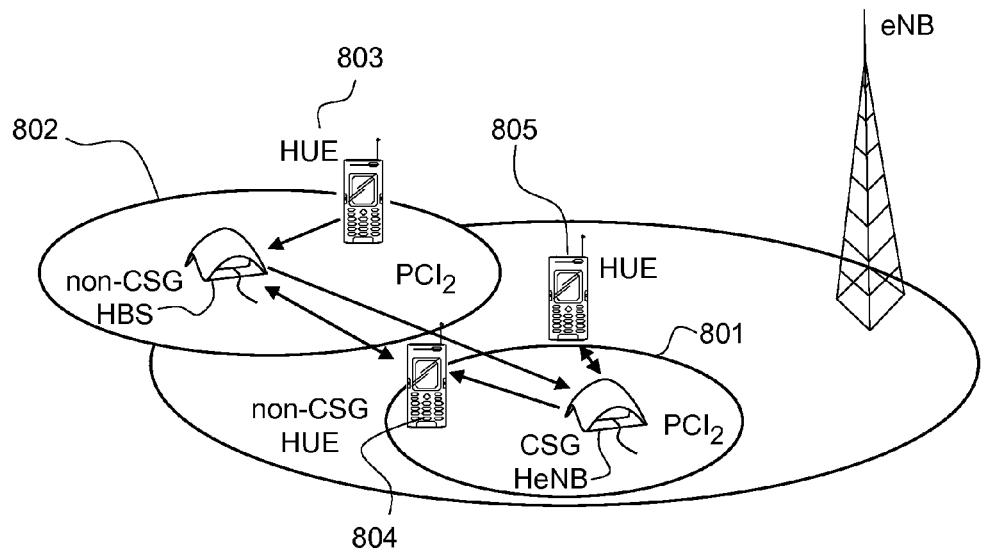
FIGS. 8a and 8b, collectively, illustrate alternative example network diagrams of the steps of FIG. 7.
Figure 8B:
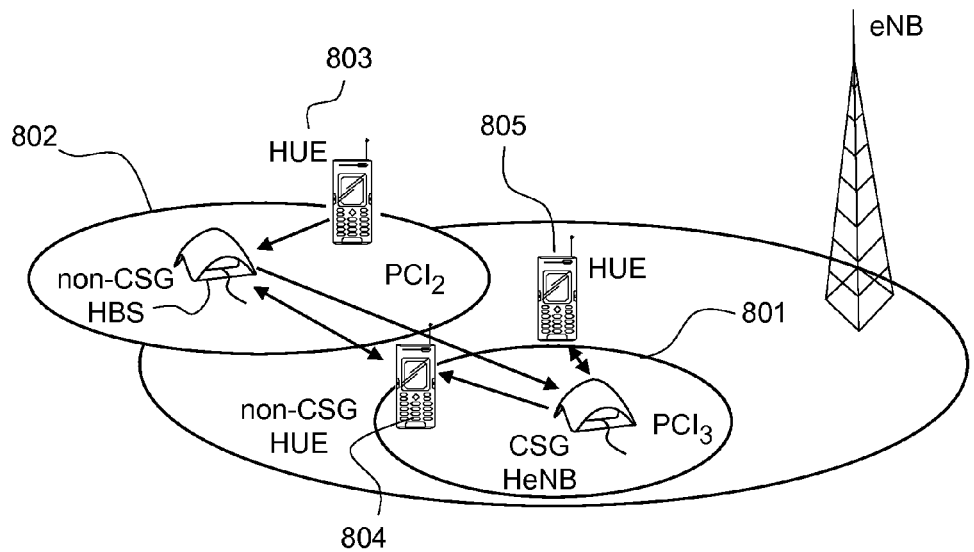

FIG. 7 is a flowchart diagram illustrating a non-limiting example of an HBS CoMP Session. FIGS. 8a and 8b illustrate alternative network diagram examples related to the steps of FIG. 7.

In step 701, a first radio network node (e.g. CSG HeNB serving cell 801 with HUE 805) detects a strong interfering second radio network node (e.g. $HBS_2$ serving cell 802 with HUEs 803 and 804. In step 702, it determines the PCI of $HBS_2$, and if the PCIs are different 707 (e.g. $PCI_1 \neq PCI_2$), adapts its PCI ($PCI_1$) by replacing it with $PCI_2$. After adaptation to $PCI_2$, or if they were the same 708 as shown in FIG. 8a (both cells 801 and 802 use $PCI_2$), it initiates a CoMP session 705, followed by time alignment of DL signals 706. Alternatively, as shown in FIG. 8b, if the PCIs were the same 708, the first node PCI could be changed to a third PCI ($PCI_3$) 709 to prevent interference between base stations.

In accordance with the example illustrated in FIG. 7, an $HBS_1$ consisting of a CSG HeNB, upon detecting a different PCI from a neighboring HeNB, may change its PCI to be the same as the neighboring HeNB and set up a CoMP session to mitigate the interference. For the establishment of the CoMP session, the DL signals of the participating CoMP HBS's are time-aligned through the use of the DL signals from the non-CSG HeNBs. However, when the CSG HBS, upon detecting a neighboring HBS with the same PCI, may optionally exploit the presence of the same PCI to set up a CoMP session with the neighboring HeNB or change its PCI to a different value to avoid interfering with the neighboring HeNB.

Two key factors that predict with a relatively high probability that the non-CSG MUE DL signal could be interfered with by the HBS DL signal, and the other way, around are that 1) the MUE is near the cell edge of the macro node coverage and/or 2) the MUE is near or in the coverage area of the HBS. This effect is shown in FIGS. 1, 6a and 6b.

Since the coverage area of a CSG HBS is in general small compared to that of a macro cell, it follows that if the CSG HBS can detect the presence of a non-CSG MUE within its coverage area and/or the HBS knows that it is located near the macro cell edge, then the CSG MUE interference scenario (shown in FIG. 1) will occur with high probability. The technology described in this application solves this problem by enabling the HeNB to perform the following tasks described below in more detail: 1) HBS performing and/or deriving at least three sets of radio measurements, 2) HBS estimating the MUE DL quality based on the radio measurements, 3) HBS determining the PCI of the targeted non-CSG MUE or HUE, and 4) HBS using the performed and/or derived radio measurements for adapting its PCI.

In a first non-limiting example, the HBS performs two sets of radio measurements: 1) at least one measurement on the macro node or non-CSG HBS DL signal, and 2) at least one measurement on the non-CSG MUE or HUE UL signal.

In a second non-limiting example embodiment, the CSG HBS has a measurement unit for performing the measurement on DL signals transmitted by a macro node (e.g., macro eNode B) or non-CSG HBS or by another neighboring CSG HBS. Non-limiting examples of DL radio measurements are DL signal strength (e.g., RSRP in LTE, CPICH RSCP in HSPA, GSM RSSI, etc.), DL signal quality (e.g., RSRQ in LTE, CPICH Ec/No in HSPA, GSM RSSI, etc.), determination of the physical cell identity or acquisition of physical cell identifier (e.g., PCI acquisition), reading or acquisition of the cell global identifier (e.g., CGI acquisition, ECGI acquisition, etc), reading of system information (e.g., reading of broadcast channel such as MIB, SIBs, etc) etc.

The CSG HBS preferably performs one or more of the following radio measurements. Any suitable signal strength or signal quality on DL signals 109 or 110 (FIG. 1) sent by the macro node or non-CSG HBS, respectively. An example of a DL signal is the DL reference signal (RS) such as cell-specific reference signal. As an example the corresponding measurement is the RSRP in LTE as stated above. In addition, the cell identifier of the macro node and/or of another neighboring HBS, which may or may not be CSG, may be acquired. CSGI acquisition is based on the DL measurements.

The HBS acquires the physical cell identifier of macro or a neighboring HBS while identifying these nodes. The PCI is encoded in a physical channel, e.g., synchronization sequences and reference or pilot signals (e.g. CRS in LTE, CPICH in HSPA, etc) transmitted by the network node.

The HBS may also perform additional measurements to further improve the accuracy and certainty of the outcome or results. Non-limiting examples of the additional measurements are described below.

The UE may also measure the signal strength of the synchronization signals sent by the macro node or non-CSG HBS. The CSG HBS may improve the DL signal strength measurement by combining multiple DL signal strength measurements (e.g., based on RS and synchronization signals). The combination or composite value can be derived by using a suitable function, e.g., by averaging, by using the largest of the multiple measurements, weighted combination, etc.

The CSG HBS may also read the broadcast channel of the macro node or another non-CSG HBS (e.g., MIB and SIB1) to acquire the cell global identifier (CGI) of the macro node or non-CSG HBS. In LTE, the CGI is often termed an evolved CGI (ECGI). But CGI or ECGI are similar terms referring to the global cell identifier which is unique in the network.

The CSG HBS may also read the broadcast channel of the macro node or non-CSG HBS to determine whether CSG indicator is signaled or not. The absence of a CSG indicator confirms that the node is not a CSG HBS. The reading of a CSG indicator of CSG by the UE may be performed using conventional procedures.

The CSG HBS may also read the broadcast channel of the macro node or non-CSG HBS to acquire the transmit power of the node, e.g., for a macro node's DL reference signals, which may then also be used by an HBS for estimating the path loss between the macro node and HBS.

The HBS may use the acquired CGI and/or missing CSG indicator to determine whether the node is a macro node or another HBS node.

The HBS may determine more than one macro node or non-CSG HBS. In that case, the CSG HBS may either select the strongest node (macro or HBS) or N strongest nodes for performing further actions/measurements described below. The HBS may also decide to select all nodes whose signal strength is above a threshold.

In a non-limiting example, the HBS determines if there is one or more MUEs or non-CSG HUEs which cause uplink interference to the CSG HBS. Typically, each UE sends the uplink signal which is scrambled with the serving cell PCI. This means the MUE transmits an uplink signal scrambled with the PCI of its serving macro node. An example of such signal may be a reference signal, e.g. sounding reference signals.

In order to determine the interfering MUEs or HUEs, the HBS performs an UL radio measurement on signals transmitted by the MUE or HUE. Examples of the UL radio measurements are UL signal strength (e.g., received interference power in LTE (RIP), received code power in HSPA, UL signal quality (e.g., SINR, SNR, etc).

More specifically the HBS performs the UL radio measurement by correlating the MUE or HUE uplink received signal with the PCI of one or more identified macro or non-CSG HBS nodes. The correlation of the UL signals with the PCI can also be performed by using all possible PCIs, e.g., all possible 504 PCIs in LTE or 510 PCIs in WCDMA. This method of blindly correlating over all PCIs is particularly useful in case the HBS only performs uplink radio measurements and does not perform DL radio measurements. It is also easy to use in the macro node which does not typically have a downlink radio measurement unit. If the MUE or HUE is detected, then the HBS measures the uplink received power from this detected MUE or HUE.

From the received signal strength of an MUE or non-CSG HUE UL signal being greater than some threshold (Threshold 1) or the derived path loss, the HBS may determine that the MUE or non-CSG HUE is within its coverage region and may also determine whether the HBS is approximately at the same distance from the macro eNB or non-CSG HBS as is the MUE or non-CSG HUE. For example, it may be assumed that if the received MUE or non-CSG HUE UL signal is strong enough (e.g., greater than some Threshold 2), then MUE or non-CSG HUE is close to the CSG HBS which may be used in another assumption that the DL received signal measured at the CSG HBS may be similar to that seen by MUE or non-CSG HUE. As another example, it may be assumed that if the received MUE or non-CSG HUE UL signal is strong enough (e.g., greater than some Threshold 1), then the MUE or non-CSG HUE is within HBS coverage.

The HBS may assume that the MUE or non-CSG HUE transmits at the maximum transmit power in the UL or may estimate the MUE on non-CSG UL power based on the predefined power control formula for UEs and the estimated DL path loss between the macro eNodeB and the CSG HBS from CSG HBS's DL measurements of macro eNodeB or non-CSG HBS signals and known transmit power of macro eNodeB or non-CSG HBS.

Thus, from the received signal strength of, e.g., 109 or 110, the CSG HBS can derive an accurate estimate of the desired MUE or non-CSG HUE DL signal.

The measurements performed as described below allow the HBS to determine that there is one or more interfering MUE's or non-CSG HUEs in its coverage region.

In an earlier described non-limiting example embodiment illustrated in FIGS. 5, 6a and 6b, the HBS mitigates the DL interference to a non-CSG MUE from the CSG HBS by changing its PCI to that of the serving eNB of the MUE and instructs the MUE handover to the CSG HeNB. This may be done particularly if the determined PCIs match with the PCI of the HBS. The HBS may also use one or more DL and/or UL radio measurements performed to decide whether the PCI should be changed or not. For example, if HBS determines that the DL signal quality of a neighbor HBS is above a threshold and its PCI matches with its own, then the HBS may adapt or switch its PCI.

During the interval that the CSG HeNB switches its PCI, it will also inform all active CSG HUEs of the new PCI and have them handover to this new PCI. During this interval of PCI adaptation, the HBS will periodically perform DL and UL channel measurements as described above to ascertain that the MUE remains within the coverage region of the CSG HBS. Once the MUE is outside the coverage region of the CSG HeNB as determined by the MUE UL signal being less than Threshold 2, the CSG HBS may perform a handover of the non-CSG MUE back to its original serving eNB, switch its own (i.e., the CSG HBS) PCI back to its original value, and inform all active CSG HUEs of the new CSG.

An alternative non-limiting example for the non-CSG MUE scenario involves having the HBS act as a type 2 relay for the non-CSG MUE in place of having the non-CSG MUE handover to the CSG HBS. In this scenario, the HBS receives the macro eNB transmissions on the DL and forward them to the MUE.

In an earlier described non-limiting example embodiment illustrated in FIGS. 3, 4a and 4b, in which the CSG HeNB detects a different PCI for one or more non-CSG HUEs, the HBS can change its PCI to the same value as the strongest non-CSG HBS and have the HUE handover to the CSG HeNB. For the non-CSG HUE scenario, handover can be efficiently achieved by X2 signaling between HBSs. During the interval that the CSG HeNB has switched its PCI, it informs all active CSG HUEs of the new PCI and has them switch to this new PCI. During this interval of PCI adaptation, the HBS will periodically perform DL and UL channel measurements as described above to ascertain that the non-CSG HUE remains within the coverage region of the CSG HBS. Once the non-CSG HUE is outside the coverage region of the CSG HeNB as determined by the non-CSG HUE UL signal being less than Threshold 2, the CSG HBS performs a handover of the non-CSG HUE back to its original serving eNB, switches its own (i.e., the CSG HBS) PCI back to its original value, and informs all active CSG HUEs of the new CSG.

In an earlier described non-limiting example embodiment illustrated in FIGS. 7, 8a and 8b, the CSG HeNB detects a non-CSG HUE with a different PCI being served by a neighboring HBS. Upon successful detection of the PCI of the non-CSG HUE as described above, the CSG HBS changes its PCI to be the same as the neighboring non-CSG HeNB and sets up a CoMP session (coordinated multi-point processing session) to mitigate the interference. The main idea of CoMP is as follows: when a UE is in the cell-edge region, it may be able to receive signals from multiple cell sites and the UE's transmission may be received at multiple cell sites regardless of the system load. Given that, if the signaling transmitted from the multiple cell sites is coordinated, the DL performance can be increased significantly. This coordination can be simple as in the techniques that focus on interference avoidance or more complex as in the case where the same data is transmitted from multiple cell sites.

In terms of downlink CoMP, two different approaches are under consideration: Coordinated scheduling, or Coordinated Beamforming (CS/CB), and Joint Processing/Joint Transmission (JP/JT). In the first category, the transmission to a single UE is transmitted from the serving cell, exactly as in the case of non-CoMP transmission. However, the scheduling, including any Beamforming functionality, is dynamically coordinated between the cells in order to control and/or reduce the interference between different transmissions. In principle, the best serving set of users will be selected so that the transmitter beams are constructed to reduce the interference to other neighboring users, while increasing the served user's signal strength.

For JP/JT, the transmission to a single UE is simultaneously transmitted from multiple transmission points, across cell sites. The multi-point transmissions will be coordinated as a single transmitter with antennas that are geographically separated. This scheme has the potential for higher performance, compared to coordination only in the scheduling, but comes at the expense of more stringent requirement on backhaul communication.

Depending on the geographical separation of the antennas, the coordinated multi-point processing method (e.g. coherent or non-coherent), and the coordinated zone definition (e.g. cell-centric or user-centric), network MIMO and collaborative MIMO have been proposed for the evolution of LTE. Depending on whether the same data to a UE is shared at different cell sites, collaborative MIMO includes single-cell antenna processing with multi-cell coordination, or multi-cell antenna processing.

In an earlier described non-limiting example embodiment illustrated in FIGS. 5, 6a and 6b, if more than one non-CSG HUE is detectable by the CSG HBS, it may chose the strongest non-CSG HUE as determined by the measurement of the UL signals. However, non-CSG HUE's other than the strongest can also be chosen.

The decision to configure a CoMP session is based upon the CSG HBS detecting and measuring the UL RS signal strength from the non-CSG HUE to be above Threshold 2. For the establishment of the CoMP session, the DL signals of the participating CoMP HBS's are time aligned through the use of the DL signals from the non-CSG HeNBs. At the start of the CoMP session, the CSG HBS switches all CSG HUEs to the CoMP PCI. The CSG HBS also periodically measures the UL signal strength of the non-CSG HUE based on its UL RS, and if the signal strength falls below Threshold 3, the CoMP session is terminated. Upon termination of the CoMP session, the CSG HBS reverts its PCI to its original value and hands over all CSG HUEs to the original PCI.

In an earlier described non-limiting example embodiment illustrated in FIGS. 7 and 8, the CSG HBS detects that a neighboring HBS has the same PCI. Detecting the same PCI involves the CSG HBS receives the UL RS of the non-CSG HUE above a level Threshold 4 transmission from the non CSG. Upon successfully detecting the presence of a non-CSG HUE with the same PCI as the CSG HBS, the CSG HBS may exploit the presence of the same PCI to set up a CoMP session with the neighboring HeNB, as described above, thereby enhancing the throughput of the non-CSG HUE. Alternatively, the CSG HBS may change its PCI to a different value to avoid interfering with the neighboring HeNB. Changing its PCI involves handover all of the CSG HUEs to a new PCI.

In an alternative non-limiting example application, the acquired PCI information may be used by a third network node. The first radio network node may also signal the acquired PCIs of the second radio network node or associated or additional information to the third network node. The associated or additional information may comprise of one or more radio measurement results, CGI, CSG indicator, CSG proximity indicator or detector, etc. The information may also include location of the MUE and/or HUE which transmitted signals are used in determining second cell identifier etc. The first node may also signal its own PCI and/or CGI to the third node. Furthermore, the first node may signal the above information to the third node either proactively (e.g., periodically or on event triggered basis such as when certain number of matched PCIs are found etc) or upon specific request from the third node.

The acquired information can be used by the third node for different purposes such as for radio network or radio resource management, network/cell planning or dimensioning, assignment of resources (e.g., BW allocation to nodes, setting of special subframe as well as UL-DLTDD configurations, etc.) to network nodes in particular to the CSG nodes, PCI planning, setting of time domain patterns for resource sharing between different layers for interference mitigation in heterogeneous network, etc. The improved PCI planning improves the mobility performance by avoiding the reuse of PCIs by closely placed network nodes, i.e., a lower call dropping rate is achieved.

The third node (e.g., SON, O&M, etc.) may use the above-acquired information for determining the cell coverage. The third node may further use this information to determine the number of nodes required to cover different coverage scenarios, e.g., indoor, outdoor, etc. In other words, the statistics can be used to dimension the network. Depending upon the PCIs used in the region, the third node may use different techniques to enhance coverage, e.g., antenna tilting in the case that PCI planning is very challenging due to high density of CSG nodes, etc.

Alternative non-limiting example applications include, but are not limited to: The PCI adaptation of the CSG HBS and the overall methodology may be employed dynamically to handover of non-CSG UEs to the CSG HBS in combination with the CSG HBS adjusting it transmit power in order to track randomly varying channel conditions and MUE mobility. The technology described herein may also be used by the HBS to mitigate interference and maximize the throughput of non-CSG UEs through the use of previously described CoMP transmissions. Alternately, adapting the first cell identifier may include either selecting a third physical cell identifier (PCI) for the first radio network node where selected third PCI is different than the PCI of at least M (M≥1) strongest second radio network nodes wherein the strongest second radio network nodes are determined based on the performed radio measurements or selecting a third cell identifier for the first radio network node out of the list of K (K≥1) cell identifiers, wherein the list of K cell identifiers is: pre-determined, configured or provided by a third network node, randomly selected by the first radio network node, or selected by the first radio network node based on the properties of the cell identifier, e.g., correlation property, correlation between first and second cell identifiers, etc; the method in a first radio network node may also include signaling the determined second cell identifier of the second radio network node or information associated with the determined second cell identifier to the third network node.

The method in a third network node may include receiving determined second cell identifier of the second radio network node or associated information from the first node and using the received information for one or more network management tasks e.g. radio resource management, cell identifier planning such as generating a list of cell identifiers for use by first and second nodes, network planning, interference management, configuration of low interference subframes or TDM patterns used in ICIC scenario, configuration of DL/UL cell bandwidth, setting of TDD UL/DL and special subframe configurations, etc.

Figure 9:
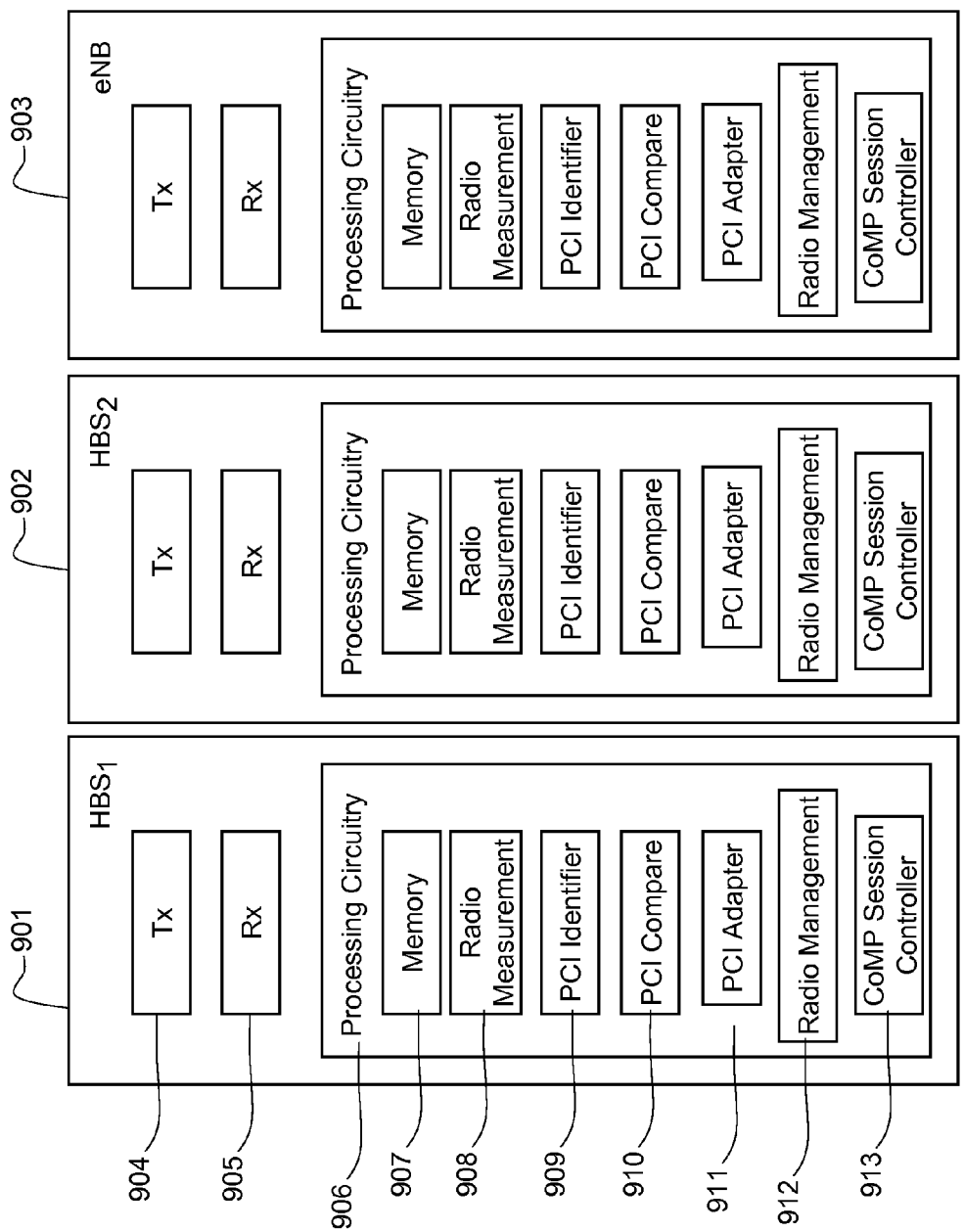
FIG. 9 illustrates an example function block system diagram of various macro and HBS radio network nodes.

The technology described in this application may be used in conventional radio based system architectures including, but not limited to, known and future node based systems (e.g. wireless, cellular, or other telecommunication equivalents) and be adapted to various known and future telecommunications standards. FIG. 9 illustrates some basic node elements of HBSs 901 and 902 along with macro node 903. Each node includes, but is not limited to, a transmitter 904, receiver 905, memory 907, processing circuitry 906, which can include known discrete devices, circuits, and/or software implemented to function as a: radio measurement element 908, PCI identifier 909, PCI comparator 910, PCI adapter element 911, radio manager 912, and CoMP session controller 913.

The technology described in this application allows the HeNB to autonomously and dynamically align its PCI to that of a non-CSG MUE or HUE to mitigate interference to and from the non-CSG MUE or HUE that is in close proximity to or within the CSG coverage region. At the same time, the non-CSG MUE or HUE can achieve a target DL throughput, ensuring that the deployment of CSG HeNB's does not compromise the performance of the underlay macro network. This is achieved by accurately estimating the actual signal strengths seen by the non-CSG MUE or HUE and does not rely on prescriptive power control algorithms that are only accurate for empirical use cases for which they were benchmarked. The technology described in this application also enables the network for PCI planning especially in a network with dense deployment. In this way, the UE does not detect more than one cell using the same PCI. This in turn improves mobility performance since the risk of call dropping is reduced.

Although the description above contains many specifics, they should not be construed as limiting but as merely providing illustrations of some presently example embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

The invention claimed is:

1. A method in a first radio network node associated with a first cell having a first cell identifier, comprising the steps of:
   performing radio signal measurements on radio signals in at least a second cell associated with a second radio network node
   determining a second cell identifier associated with the second cell based on the performed measurements,
   comparing the first cell identifier of the first radio network node with the determined second cell identifier of the second radio network node, and
   adapting the first cell identifier with the second cell identifier based on the comparing step including replacing the first cell identifier with the second cell identifier when the first cell identifier and the second cell identifier do not match.

2. The method according to claim 1, further comprising performing one or more radio management tasks using the adapted cell identifier.

3. The method of claim 2, wherein the one or more radio management tasks comprise one or more of: radio resource management, cell identifier planning, network planning, interference management, configuration of low interference subframes or time-division multiplexing (TDM) patterns, configuration of downlink/uplink (DL/UL) cell bandwidth, setting of time division duplexing uplink/downlink (TDD UL/DL), and subframe configurations.

4. The method of claim 3, further comprising replacing of the first cell identifier in accordance with one or more of the following triggers:
   periodic triggering,
   receiving a request from a third radio network node,
   receiving a request from a subscriber or an owner of the first radio network node;
   making one or more of uplink (UL) and/or downlink (DL) radio measurements;
   detecting a change in physical location or geographical proximity of the first radio network node, or
   triggering based on one or more pre-determined rules.

5. The method of claim 4, wherein the one or more pre-determined rules comprises triggering upon:
   initial setup of the first network node;
   initialization of the first network node;
   configuration of one or more of radio parameters used in the first network node, or
   upgrading and/or downgrading of the first network.

6. The method according to claim 1, wherein the radio signal measurements, in at least the second cell, comprise measurement on at least one of: an uplink (UL) signal transmitted by user equipment (UE) served by a second cell or a downlink (DL) signal transmitted by the second radio network node.

7. The method of claim 6, further comprising, when the first and second cell identifiers do not match, replacing the first cell identifier when at least one or more of the following conditions is met:
   one or more uplink (UL) and/or downlink (DL) radio measurements used for determining the second cell identifier are above an interference threshold or are above their respective thresholds, or
   a total number of replacement attempts of first cell identifier does not exceed a certain number N, where $N \geq 1$ over a certain time period T1.

8. The method according to claim 1, further comprising notifying active UEs, served by the first radio network node, when the adapting step includes changing the first cell identifier.

9. The method according to claim 1, further comprising reverting back to the first cell identifier when the uplink (UL) and/or the downlink (DL) signal radio measurements fall below an interference level or threshold.

10. The method of claim 9, further comprising notifying active UEs, served by the first radio network node, of the reversion back to the first cell identifier.

11. The method of claim 1, wherein adapting the first cell identifier comprises retaining the first cell identifier when the first cell identifier and the second cell identifier are the same.

12. The method according to claim 1, further comprising subsequently setting up a coordinated multi-point transmission/reception session.

13. The method of claim 12, further comprising aligning downlink (DL) signals of the first radio network node and the second radio network node.

14. The method of claim 1, wherein adapting the first cell identifier comprises replacing the first cell identifier with a third cell identifier when the first cell identifier and the second cell identifier are the same.

15. The method according to claim 1, further comprising based on the radio measurements and adapted first cell identifier, accepting handover of at least one user equipment (UE) served by the second radio network node.

16. The method according to claim 1, wherein the first radio network node is a home base station associated with a closed subscriber group.

17. The method of claim 1, further comprising signaling the determined second cell identifier or information associated with the determined second cell identifier to a third radio network node.

18. A first radio network node associated with a first cell having a first cell identifier, comprising:
   processing circuitry configured to:
      perform radio signal measurements on radio signals in at least a second cell associated with a second radio network node,
      determine a second cell identifier associated with the second cell based on the performed measurements,
      compare the first cell identifier of the first radio network node with the determined second cell identifier of the second radio network node, and
      adapt the first cell identifier with the second cell identifier, based on the comparison, by replacing the first cell identifier with the second cell identifier when the first cell identifier and the second cell identifier do not match.

19. The first radio network node according to claim 18, wherein the processing circuitry of the first radio network node is configured to perform one or more radio management tasks using the adapted cell identifier.

20. The first radio network node of claim 18, wherein the radio signal measurements in at least the second cell comprises measurement on at least one of: an uplink (UL) signal transmitted by user equipment (UE) served by a second cell or a downlink (DL) signal transmitted by the second radio network node.

21. The first radio network node of claim 18, wherein the processing circuitry of the first radio network node is further configured to, after replacement of the first cell identifier, set-up a coordinated multi-point transmission/reception session between the first radio network node and the second radio network node.

22. The first radio network node of claim 18, wherein the processing circuitry of the first radio network node is configured to adapt the first cell identifier by retaining the first cell identifier when the first cell identifier and the second cell identifier are the same.

23. The first radio network node of claim 18, wherein the processing circuitry of the first radio network node is further configured to adapt the first cell identifier by replacing the first cell identifier with a third cell identifier when the first cell identifier and the second cell identifier are the same.

24. The first radio network node of claim 18, wherein the processing circuitry of the first radio network node is further configured to notify UEs served by the first radio network node of any adaptation of the first cell identifier which changes the first cell identifier.

25. The first radio network node of claim 18, wherein the processing circuitry of the first radio network node is further configured, based on the radio measurements and adapted first cell identifier, to accept handover of at least one user equipment (UE) served by the second radio network node.

26. The first radio network node of claim 18, wherein the first radio network node is a home base station associated with a closed subscriber group.

\* \* \* \* \*

UNITED STATES PATENT AND TRADEMARK OFFICE
CERTIFICATE OF CORRECTION

PATENT NO.        : 8,804,561 B2
APPLICATION NO.   : 13/501172
DATED             : August 12, 2014
INVENTOR(S)       : Kazmi et al.

Page 1 of 1

It is certified that error appears in the above-identified patent and that said Letters Patent is hereby corrected as shown below:

In the Specification

In Column 8, Line 18, delete "$PCI_1$ $PCI_2$" and insert -- $PCI_1 \neq PCI_2$ --, therefor.

In Column 8, Line 34, delete "$PCI_S$" and insert -- $PCI_3$ --, therefor.

Signed and Sealed this
Twenty-eighth Day of July, 2015

Michelle K. Lee
*Director of the United States Patent and Trademark Office*